United States Patent [19]
Ko

[11] Patent Number: 5,373,141
[45] Date of Patent: Dec. 13, 1994

[54] FUSING TEMPERATURE CONTROL CIRCUIT

[75] Inventor: Chang-Kyung Ko, Suwon, Rep. of Korea

[73] Assignee: SamSung Electronics Co., Ltd., Suwon, Rep. of Korea

[21] Appl. No.: 64,862

[22] Filed: May 24, 1993

[30] Foreign Application Priority Data

May 22, 1992 [KR] Rep. of Korea ............... 8700/1992

[51] Int. Cl.⁵ .................................... H05B 1/02
[52] U.S. Cl. .................................... 219/497; 219/481; 219/501; 219/505; 374/163; 323/369
[58] Field of Search .............. 219/501, 481, 505, 504, 219/497, 499, 494; 374/163, 172; 323/369

[56] References Cited

U.S. PATENT DOCUMENTS

| | | | |
|---|---|---|---|
| 4,467,386 | 8/1984 | Wasson | 219/501 |
| 4,564,748 | 1/1986 | Gupton | 219/497 |
| 4,613,746 | 9/1986 | MacLaughlin | 219/490 |
| 4,793,343 | 12/1988 | Cummins, Jr. et al. | 219/506 |
| 4,845,341 | 7/1989 | Rae | 219/497 |
| 5,191,191 | 3/1993 | St Aubyn | 219/485 |
| 5,229,579 | 7/1993 | Ingraham et al. | 219/202 |

Primary Examiner—Mark H. Paschall
Attorney, Agent, or Firm—Robert E. Bushnell

[57] ABSTRACT

A circuit for controlling the temperature of a system by sensing a temperature is disclosed. The circuit includes a heater heated by a given control signal, a thermistor installed around the heater and having variable resistivity according to an environmental temperature, a temperature sensing circuit for supplying a supply voltage of a given level to either one terminal of the thermistor and generating a temperature detecting voltage corresponding to the variation of resistivity of the thermistor, a disconnection detecting circuit connected between the supply voltage and a ground voltage, for generating a disconnection state signal in response to the current cutoff of the other terminal of the thermistor, a temperature state detecting circuit for generating a temperature state signal by comparing the temperature detecting voltage with a preset reference voltage, and a heater control circuit connected to receive the disconnection state and temperature state signals generated respectively from the disconnection detecting and temperature state detecting circuits, for controlling the heater.

16 Claims, 2 Drawing Sheets

FUSING TEMPERATURE CONTROL CIRCUIT

BACKGROUND OF THE INVENTION

1. Technical Field

The present invention relates to a heating control circuit, and more particularly, to a process and a circuit for controlling the temperature of an electronic system to a preset temperature by sensing a disconnection of a temperature sensor located within the electronic system having a heating element such as a heater.

2. Background Art

Generally, electronic systems such as, by way of example, laser beam printers, laser array printers, copiers, photomultilithographic duplicators, facsimile telecommunication units, and other office machines, perform a predetermined operation using an input of a supply voltage, and execute a corresponding operation in response to an exterior command. Typically, these electronic systems have a heater for preparing the operation of the system, and the heater maintains the temperature of a fusing unit to a preset temperature in order to fuse a developing material, called toner, onto copying or printing paper during a copying or printing operation. As is well known in the art, if the temperature of the fusing unit positioned within the system has been not preheated to the preset temperature, the toner will not be fused onto the copying or printing paper. Therefore, office machines with a heater must both heat the fusing unit by appropriately driving the heater during a stand-by mode and lower the temperature of the fusing unit by controlling the heater to not drive the heater whenever the fusing unit is in an overheated state.

In such laser beam printers or copiers, the temperature of the fusing unit is about 150° C. during a stand-by state and about 180° C. during a printing state. The temperature of the fusing unit is controlled by a heater control circuit for controlling the temperature of the heater to a temperature within the range of 150°-180° C., in response to the output of a temperature sensor for sensing the temperature of the fusing unit. Therefore, office machines having a heater necessarily include a temperature sensor for sensing the temperature of the interior of the system in order to appropriately control the temperature. Moreover, the heater control circuit controls the temperature of the heater to a preset temperature in response to the output of the temperature sensor, in order to adjust the temperature of the fusing unit.

The system including the heater control circuit for controlling the temperature of the fusing unit in response to the output of the temperature sensor has a circuit for checking the temperature sensor in order to prevent the fusing unit from overheating. That is, if the temperature sensor is disconnected or separated from a connector, an error in detection of the temperature of the temperature sensor will occur; if the heater control circuit continuously the heater energizes, the temperature of the fusing unit will overheat, and as a result, a fire may occur. Therefore, a system with the heater should have a heating control circuit for preventing the fusing unit from overheating.

One design of a heating control circuit for preventing the fusing unit from overheating uses a thermistor to sense the temperature of the heater and generates a temperature detecting voltage corresponding thereto with a preset disconnection detecting voltage circuit and produces a disconnection signal when the disconnection detecting voltage is greater than the temperature detecting voltage.

Such a circuit shown can not easily detect the disconnection of the thermistor, and as a result, it is difficult to accurately control the temperature of the fusing unit. That is, when the thermistor is disconnected or the ambient temperature is very low, for example, about 5° C., the level of the temperature detecting voltage is nearly the same. In more detail, if the thermistor is displaced, dislodged or disconnected from proximity to the fusing unit, or if the ambient temperature is very low, the temperature detecting voltage is very high, and thus, it is difficult to set the disconnection detecting voltage so as to accommodate a range of values of the temperature detecting voltage that corresponds to a very low ambient temperature.

SUMMARY OF THE INVENTION

It is therefore an object of the present invention to provide an improved process and circuit for detecting a disconnection state of a sensor in a control circuit.

It is another object to provide a process and a circuit capable of easily detecting the disconnection state of a temperature sensor in an electronic system for controlling a temperature by use of the temperature sensor.

It is a further object to provide a circuit for detecting the disconnection state and overheating state of a temperature sensor used for sensing the temperature of a heater.

These and other objects may be realized in accordance with one aspect of the present invention, in a process and in a heating control circuit constructed using the principles of the present invention, with a heater heated by a given control signal, a thermistor installed around the heater and exhibiting a variable resistance according to an ambient environmental temperature, a temperature sensing circuit for supplying a supply voltage of a given level to either terminal of the thermistor and generating a temperature detecting voltage corresponding to the variation of resistance of the thermistor, a disconnection detecting circuit connected between the supply voltage and a ground voltage, for generating a disconnection state signal in response to the current cutoff of the other terminal of the thermistor, a temperature state detecting circuit for generating a temperature state signal by comparing the temperature detecting voltage with a preset reference voltage, and a heater control circuit connected to receive the disconnection state and temperature state signals generated respectively from the disconnection detecting and temperature state detecting circuits, for controlling the heater.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
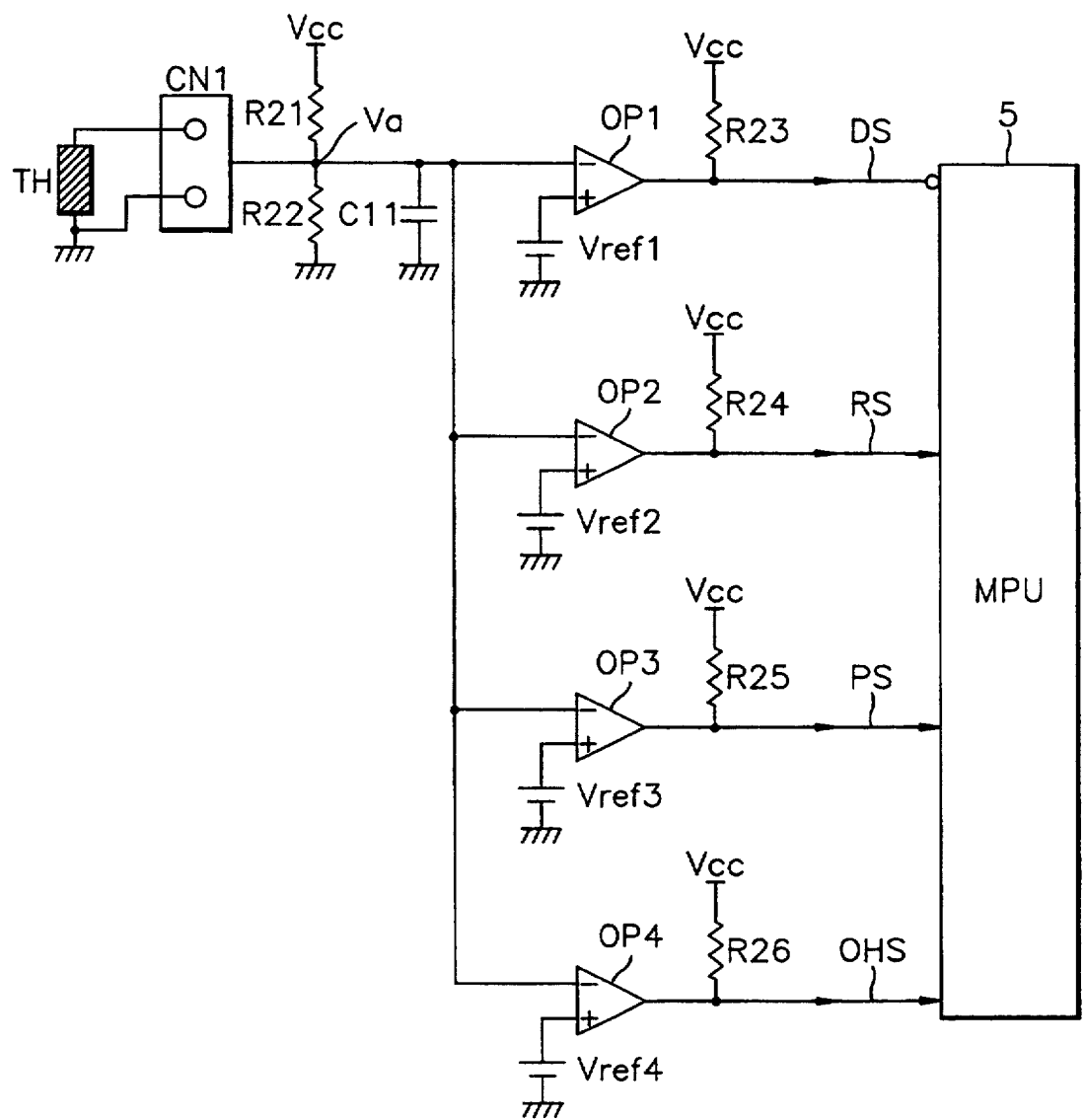
FIG. 1 is a circuit diagram of a conventional heating control circuit.

Turning now to the drawings, FIG. 1 is a circuit diagram of a convectional heating control circuit. A temperature sensing circuit having a first resistor R21 and a thermistor TH connected serially between a supply voltage Vcc and a ground voltage, and a second resistor R22 connected in parallel to the thermistor TH senses the temperature of the heater and generates a temperature detecting voltage Va corresponding thereto. A first comparator OP1 compares a preset disconnection detecting voltage Vref1 with the temperature detecting voltage Va generated from the temperature sensing circuit and produces a disconnection signal DS when the disconnection detecting voltage Vref1 is greater than the temperature detecting voltage Va. A second comparator OP2 compares a preset ready detecting voltage Vref2 with the temperature detecting voltage Va and generates a ready signal RS when the ready detecting voltage Vref2 is greater than the temperature detecting voltage Va. A third comparator OP3 compares a preset printing detecting voltage Vref3 with the temperature detecting voltage Va and generates a printing signal PS when the printing detecting voltage Vref3 is greater than the temperature detecting voltage Va. A fourth comparator OP4 compares a preset overheating detecting voltage Vref4 with the temperature detecting voltage Va and produces an overheating signal OHS when the overheating detecting voltage Vref4 is greater than the temperature detecting voltage Va. A microprocessor (MPU) receives the disconnection, ready, printing and overheating signals DS, RS, PS and OHS generated respectively from the first to fourth comparators OP1 to OP4, and detects the disconnection of the thermistor TH and the temperature state of the heater, to control the system.

In this case, the relationship between the detecting voltages is as follows:

$$V_{ref1} > V_{ref2} > V_{ref3} > V_{ref4} \quad (1)$$

Resistors R23 to R26 are pull-up resistors for pulling up the outputs of the comparators OP1 to OP4, and a connector CN1 connects the thermistor TH to a connecting point between the resistors R21 and R22. Thermistor TH, in a temperature sensor having characteristics of decreased resistance when the temperature rises, is positioned around the heater.

If the supply voltage Vcc is applied to each portion of the circuit of FIG. 1, the temperature detecting voltage Va determined by the resistance Rt of the thermistor TH varying according to the temperature of the heater (not shown) for heating the fusing unit, and the resistors R21 and R22 can be represented by the following equation (2) shown below:

$$V_a = \frac{R_{22} \| R_t}{R_{21} + (R_{22} \| R_t)} \cdot V_{cc} \quad (2)$$

Since the resistance of thermistor TH decreases when the temperature rises, the temperature detecting voltage Va is varied by the variation in temperature of the heater. If the temperature of the heater rises, the detecting voltage Va decreases. Meanwhile, the respective comparators OP1 to OP4 provide comparisons of the preset detecting voltages Vref1, Vref2, Vref3 and Vref4 received respectively through their non-inverting terminals (+) with the temperature detecting voltage Va received through their inverting terminals (−), and supply their respective signals obtained by the comparisons to the MPU 5.

For example, if the temperature of the heater is below a ready state, that is, if the temperature detecting voltage Va is less than the disconnection detecting voltage Vref1 and greater than the ready detecting voltage Vref2, the comparators OP1 to OP4 supply logic HIGH, LOW, LOW, LOW signals to the MPU 5. The MPU 5 senses the disconnection state of the thermistor TH and the temperature state of the fusing unit by the outputs of the comparators OP1 to OP4. In this case, the disconnection detecting voltage Vref1 should be set to a higher voltage than the temperature detecting voltage Va generated from the temperature sensing circuit including the resistors R21 and R22 and the thermistor TH, at the normal temperature.

Thus, if the temperature of the heater is judged to be in a lower state than the temperature at the stand-by state, the MPU 5 raises the temperature of the fusing unit by driving the heater. If the temperature of the fusing unit is raised, the temperature detecting voltage Va detected by resistors R21, R22 and the thermistor TH decreases in inverse proportion to the temperature.

If the temperature of the heater is raised to the temperature of the printing ready state, the temperature detecting voltage Va is lowered to a lower level than the preset ready detecting voltage Vref2. Hence, the output of the second comparator OP2 is set to logic "HIGH". If the temperature of the heater is raised to a higher level than the printing detecting temperature, the output of the third comparator OP3 is set to logic "HIGH". If the temperature of the heater is overheated and thus the temperature detecting voltage Va is lowered to a lower level than the overheating detecting voltage Vref4, the output of the fourth comparator OP4 is set to logic "HIGH". Therefore, the MPU6 can confirm the temperature state of the heater by the output signals from comparators OP2 through OP4 and thus control the temperature of the heater.

The circuit shown in FIG. 1 can not easily detect the disconnection of the thermistor TH, however, and as a result, it is difficult to accurately control the temperature of the fusing unit. That is, when the thermistor TH is disconnected or the ambient temperature is very low, for example, about 5° C., the level of the temperature detecting voltage Va is nearly the same. More specifically, if the thermistor TH is either disconnected or is displaced from proximity to the fusing unit, or if the ambient temperature is very low, because the resistance of the thermistor TH is greater than resistor R22, the temperature detecting voltage Va established by equation (2) is as follows:

$$V_a = \frac{R_{22}}{R_{21} + R_{22}} \cdot V_{cc} \quad (3)$$

Therefore, if the ambient temperature is very low, the temperature detecting voltage Va is very high, and thus, it is difficult to set the disconnection detecting voltage Vref1 so as to accommodate a range of values of the temperature detecting voltage Va including a voltage that corresponds to a very low ambient temperature.

Figure 2:
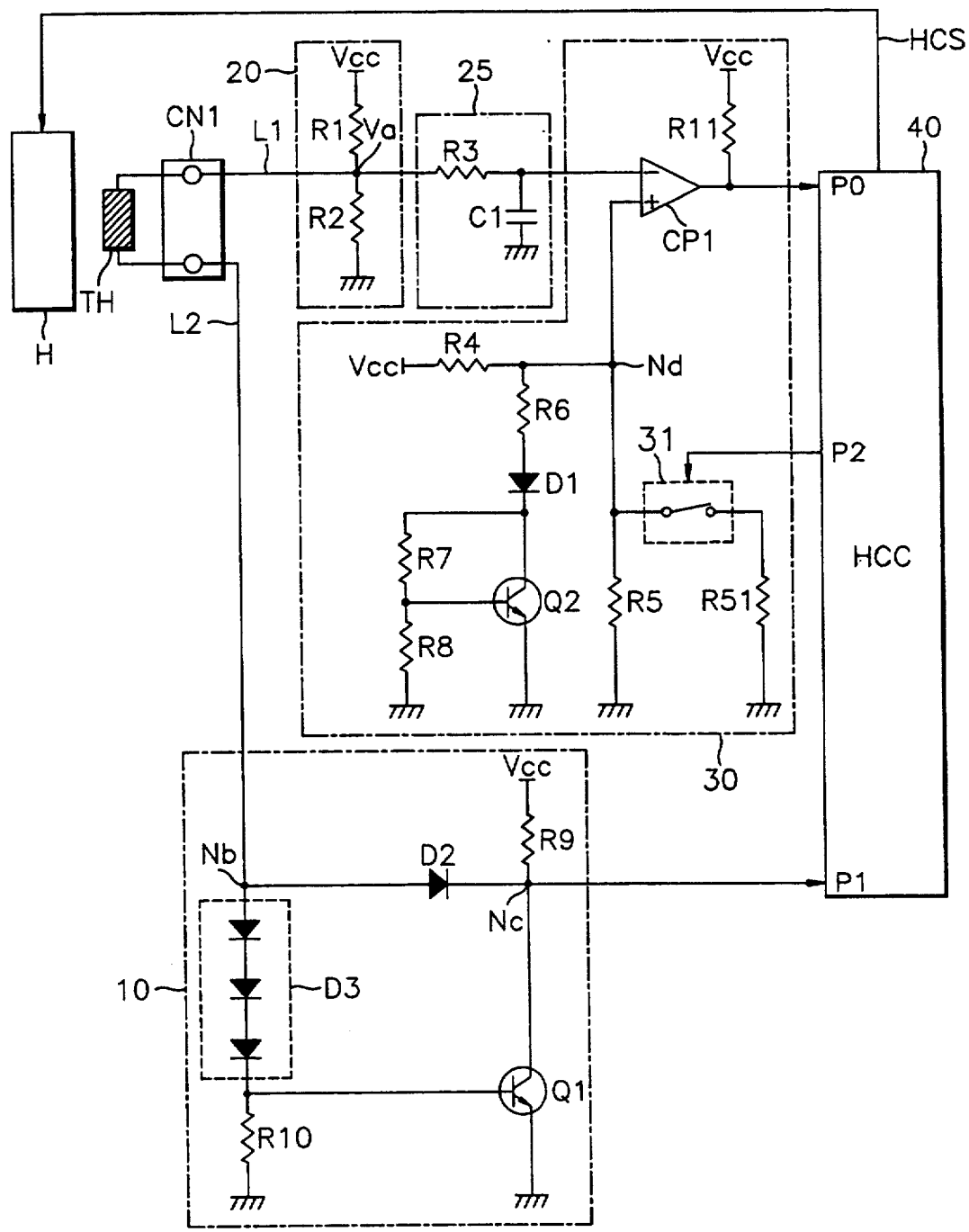
FIG. 2 is a circuit diagram of a heating control circuit according to the present invention.

Referring now to the circuit represented by FIG. 2, a heater H heats a fusing unit in response to a heater control signal HCS. A thermistor TH installed around the heater H or the fusing unit has a variable resistance according to the environmental temperature. A temperature sensing circuit 20 having resistors R1 and R2 connected serially between a supply voltage Vcc and a ground voltage generates a temperature detecting voltage Va corresponding to the variation of temperature of the heater H. A connecting point between the resistors R1 and R2 is coupled to either terminal of the thermistor TH. A disconnection detecting circuit 10 connected between the supply voltage Vcc and the ground voltage, generates a disconnection state signal corresponding to the output voltage L2 from the other terminal of the thermistor TH. A filter 25 low-pass filters the temperature detecting voltage Va generated from the temperature sensing circuit 20. A temperature state detecting circuit 30 has a preset reference voltage of a given level for detecting an overheating state and generates a temperature state signal by comparing the temperature detecting voltage Va with the reference voltage. A heater control circuit (HCC) 40 supplies heater control signal HCS to heater H and receives the disconnection state signal and the temperature state signal generated respectively from the disconnection detecting circuit 10 and the temperature state detecting circuit 30, to control the output of heater control signal HCS.

The disconnection state detecting circuit 10 has a resistor R9 and a transistor Q1 connected serially between the supply voltage Vcc and the ground voltage, a driver D3 formed by a plurality of serially coupled diodes, connected between one terminal of the thermistor TH and bias resistor R10, for driving the transistor Q1 in response to an input voltage from the other terminal or thermistor TH, and a diode D2 connected between the other terminal of the thermistor TH and the collector of the transistor Q1, for clamping the input voltage to a given level in response to the switching of the transistor Q1.

The driver for controlling the base electrode of transistor Q1 includes a voltage dropping circuit D3 having three diodes connected in series between the one terminal of the thermistor TH and one lead of bias resistor R10 for current-voltage converting. The second lead resistor R10 may be coupled to a reference potential such as a ground voltage.

The filter 25 may be formed by a resistor R3 and a capacitor C1 connected serially between the connecting node between the resistors R1 and R2 and the ground voltage, in order to eliminate the noise of the temperature detecting voltage Va.

The temperature state detecting circuit 30 has a comparator CP1, a reference voltage generating circuit formed by resistors R4 and R5 coupled serially between the supply voltage Vcc and the ground voltage, and an offset compensating circuit including a resistor R6, a diode D1, and a transistor Q2 coupled between a connecting node Nd between resistors R4 and R5 and the ground voltage, and resistors R7 and R8 for biasing the base electrode of transistor Q2. The reference voltage generating circuit divides the supply voltage Vcc to provide the reference voltage Vref for an overheating temperature detecting level. Comparator CP1 generates the temperature state signal by comparing the temperature detecting voltage Va produced from filter 25 with the reference voltage Vref provided at node Nd. The offset compensating circuit compensates for the reference voltage Vref by the voltage drop of the disconnection state detecting circuit 10.

A resistor 51 is connected in parallel to resistor R5 of the reference voltage generating circuit. An analog switch 31 is turned on during a stand-by mode and turned off during a printing mode, thereby to connect either resistor RS1 to resistor R5 in parallel or to cut off resistor RS1 from resistor R5. Analog switch 31 can be controlled by the HCC 40 or switched to an operating mode using other hardware. In the preferred embodiment, HCC 40 controls analog Switch 31. The HCC 40 may be easily achieved by the combination of hardware such as a microprocessor, a transistor-transistor logic circuit (TYL) or the like.

An example of operation of FIG. 2 will now be described in detail under the condition that HCC 40 reads the temperature state detecting signal and the disconnection state signal generated from comparator CP1 and the collector of the transistor Q1 through input ports PO and PT, respectively, and generates the heater control signal HCS for heater H, to control the heater H. In addition, it is assumed that thermistor TH is accurately connected to a connector CN1.

If supply voltage Vcc is applied to each portion of the circuit shown in FIG. 2, then supply voltage Vcc is divided by resistors R1 and R2 as shown in the following expression (4) and fed to one terminal of thermistor TH.

$$V_a = \frac{R_t}{R_1 + R_2} \cdot V_{cc} \qquad (4)$$

where Rt is the resistance value of thermistor TH.

If the divided voltage is supplied to one terminal of thermistor TH, a voltage obtained by subtracting the voltage drop of thermistor TH from the divided voltage by the expression (4) is applied to a node Nb between the other terminal of the thermistor TH and the diode array D3. At this time, the voltage of node Nb is divided by the diode array D3 and the bias resistor R10 and the divided voltage is fed to the base of the transistor Q1. Hence, transistor Q1 is driven into a saturation state. That is, if the thermistor TH is accurately connected to connector clock CN1, transistor Q1 in disconnection state detecting circuit 10 is turned on, and the voltage of a node Nb is about 0.2 volts (in the case that the transistor Q1 is made of germanium). Namely, logic LOW signal indicating that thermistor TH is in a normal state is applied to HCC 40.

The HCC 40 receiving the logic LOW signal generated from the collector of transistor Q1 supplies the initial heater control signal HCS to heater H. The heater H begins to heat in response to the heater control signal HCS and the environmental temperature of the heater is raised.

The heater H has a power supply circuit for providing a driving voltage to a heating element in response to the heater control signal HCS. The power supply circuit may use a "SSR (solid state relay)". For example, the power supply can be provided to heater H by the heater control signal HCS using a photo triac of a photo coupler.

If the temperature of the heater H is raised, the resistance of the thermistor TH is varied from approximately 300Ω to 1KΩ. Therefore, the transistor Q1 uses a Darlington transistor which is less influenced by the variation of base current in order that the disconnection state signal is equally generated. The diode array D3 for biasing transistor Q1 may use at least one diode.

If transistor Q1 is saturated, diode D2 bypasses the current passing through the thermistor TH through the collector-to-emitter path of the transistor Q1. Then the voltage of node Nb is nearly 0 volts. When transistor Q1 is turned on, the resistance of resistor R9 must be adjusted so that node Nc is at a logic LOW level.

On the other hand, if the resistance of thermistor TH is varied according to variation of temperature of the heater H, the temperature detecting voltage Va generated from the connecting node between the resistors R1 and R2 is as follows:

$$V_a = \frac{R_2 \| R_t}{R_1 + (R_2 \| R_t)} \cdot V_{cc} \qquad (5)$$

When thermistor TH is in a normal state, if the temperature of the heater H is raised, the temperature detecting voltage Va decreases, and if the temperature becomes low, the temperature detecting voltage Va increases. The temperature detecting voltage Va corresponding to the variation of temperature is lowpass filtered by resistor R3 and capacitor C1, and is then applied to the inverting terminal (−) of comparator CP1.

Comparator CP1 compares reference voltage Vref preset to the level of the overheating temperature detecting voltage by resistors R4 and R5 with the temperature detecting voltage Va and generates the temperature state detecting signal. For instance, if the temperature detecting voltage Va is lower than the reference voltage Vref, the overheating detecting signal of logic HIGH is produced. If the temperature detecting voltage Va is higher than the reference voltage Vref, a logic LOW signal indicating that the overheating signal is not detected is generated at port PO of HCC 40.

Therefore, the HCC 40 receives the disconnection state detecting signal indicating the disconnection state of the thermistor TH and the temperature state signal representing the temperature state of the heater H.

If a logic LOW the disconnection state signal is received, Hcc 40 judges that thermistor TH is in a normal state, and checks the heating state of heater H by the temperature state signal applied to port PO to generate heater control signal HCS. In more detail, if the output of comparator CP1 is a logic LOW state, HCC 40 judges that the heater H is not being heated and generates heater control signal HCS continuously. Further, if the output of comparator CP1 is a logic HIGH state, HCC 40 determines that heater H in is an overheated state and cuts off the heater control signal HCS so to stop the driving of heater H.

Resistors R6, R7, and R8, diode D1 and the transistor Q2 constituting the offset compensating circuit to compensate for using the voltage drop of the diode D2 and the thermistor Q1 a voltage across the other terminal of the thermistor TH.

If the thermistor TH is disconnected or separated from connector CN1, there is no voltage across the node Nb and the ground terminal, transistor Q1 is turned off and the node Nc of the collector of the transistor D3 is at a logic HIGH, which is at the supply voltage Vcc level. Thus, if thermistor TH is disconnected, the disconnection state signal generated from the collector of transistor Q1 is set to a logic HIGH to represent the disconnection state.

If the disconnection state signal of a logic HIGH is generated from the collector of the transistor 01, HCC 40 judges that thermistor TH is disconnected and cuts off the transmission of heater control signal HCS. That is, when the thermistor TH is disconnected, the heater H is not driven, thus preventing malfunction of the system.

The temperature of the heater H can be more precisely adjusted by varying the reference voltage Vref according to standby and printing modes. Namely, if an operating mode signal is supplied to HCC 40, HCC 40 provides a reference voltage control signal corresponding to the operating mode signal to a port P2. For instance, if the current operational mode is the standby mode, HCC40 produces a control signal for driving analog switch 31 into the "on" state. If the current operational mode is in the printing mode, HCC 40 generates the control signal for driving analog switch 31 into the "off" state.

Assuming that the reference voltage of node Nd at the stand-by mode is Pvref the voltage Pvref can be represented by the following expression (6):

$$P_{vref} = \frac{R_5 \| R_{51}}{R_4 + (R_5 \| R_{51})} \cdot V_{cc} \qquad (6)$$

If the resistance values of all the resistor are R, the value of reference voltage Pvref at the stand-by mode will be:

$$P_{Vref} = \tfrac{1}{3} \cdot V_{cc} \qquad (7)$$

When the temperature of the heater H is controlled by the reference voltage Rvref of the expression (6), if the current mode becomes the printing mode, the analog switch 31 is turned on by the control of the HCC 40. Assuming that the reference voltage at node Nd during the printing mode is Pvref, the value of voltage Pvref is as follows:

$$P_{vref} = \frac{R_5}{R_4 + R_5} \cdot V_{cc} \qquad (8)$$

If the resistance values of resistor R4 and R5 are R, the reference voltage Pvref at the printing mode will be raised as follows:

$$P_{Vref} = \tfrac{1}{2} \cdot V_{cc} \qquad (9)$$

Therefore, if the current mode is in the printing mode, the reference voltage for controlling the temperature of the heater H is raised and the heater H is controlled with more high temperature.

As may be apparent from the aforementioned description, the heating control circuit embodying the present invention may prevent the malfunction of the system by accurately discriminating the connection and temperature states from the voltage generated from the temperature sensor.

While preferred embodiments of the present invention have been particularly shown and described, it will be understood by those skilled in the art that foregoing and other changes in form and details may be made without departing from the spirit and scope of the present invention.

I claim:

1. A heating control circuit for a printing device having a heating element heated in response to a heating control signal, said circuit further comprising:

temperature detecting means for generating a temperature detecting voltage corresponding to a heating temperature of said heating element, said temperature detecting means having a temperature sensor, a first current-to-voltage converter connected serially between a first supply voltage and a terminal of said temperature detecting means and a second current to voltage converter connected between said terminal of said temperature detecting means and a ground potential;

disconnection detecting means comprised of a transistor, a plurality of diodes and a plurality of resistors, for generating a disconnection detecting signal in dependence upon a voltage difference between said temperature detecting voltage and a voltage across said temperature sensor for indicating whether said temperature detecting means is correctly connected in said heating control circuit; and heating control means for supplying said heating control signal to said heating element in response to said temperature detecting voltage applied from said temperature detecting means, and cutting off said heating control signal applied to said heating element when said temperature detecting means is not correctly connected in said heating circuit, in response to said disconnection detecting signal generated from said disconnection detecting means.

2. The heating control circuit as claimed in claim 1, further comprising:

heating temperature state detecting means for making a comparison between a reference voltage corresponding to a predetermined temperature with said temperature detecting voltage and providing a temperature state signal to said heating control means in dependence upon said comparison.

3. The heating control circuit as claimed in claim 2, further comprised of said heating control means generating said heating control signal selectively, in response to said temperature state signal of said heating temperature state detecting means.

4. The heating control circuit as claimed in claim 3, further comprising:

reference voltage varying means for varying said reference voltage in response to a present operational state of said printing device from a plurality of operation states including a standby mode and an operating mode.

5. The heating control circuit as claimed in claim 3, further comprising:

reference voltage varying means for varying the level of said reference voltage in response to a reference voltage control signal produced by said heating control means, wherein said reference voltage control signal indicates a plurality of possible operational states of said printing device, including a standby mode and an operating mode.

6. A heating control circuit for a printing device having a heater controlled by a heater control signal and having a thermistor installed around said heater, said thermistor exhibiting resistance varying according to ambient temperature, said heating control circuit comprising:

temperature sensing means for supplying a supply voltage of a given level to one terminal of said thermistor and for generating a temperature detecting voltage representing said ambient temperature corresponding to variation of resistance of said thermistor;

disconnection detecting means connected between said supply voltage and a ground voltage terminal, for generating a disconnection state signal indicating whether said thermistor is correctly connected in said heating circuit in response to cutoff of current through a second terminal of said thermistor;

temperature state detecting means for generating a temperature state signal corresponding to said ambient temperature by comparing said temperature detecting voltage with a preset reference voltage; and heater control means for generating said heater control signal to control said heater in dependence upon said disconnection state signal and said temperature state signal.

7. The heating control circuit as claimed in claim 6, further comprised of said disconnection detecting means comprising:

switching means connected serially between said supply voltage and said ground voltage terminal, for supplying a disconnection state signal to said heater control means, said disconnection state signal comprising a normal state signal indicating said thermistor is correctly connected in said heating control circuit and a disconnection detecting signal indicating said thermistor is incorrectly connected in said heating control circuit, and driving means for driving said switching means by detecting loop current flowing into said ground voltage terminal from the second terminal of said thermistor.

8. The heating control circuit as claimed in claim 7, further comprised of said driving means comprising at least one diode and a current limiting resistor, connected serially between the second terminal of said thermistor and said ground voltage terminal, and dividing a voltage across the other terminal of said thermistor to a driving voltage of said switching means.

9. The heating control circuit as claimed in claim 7, further comprised of said temperature state detecting means comprising:

reference voltage generating means connected between said supply voltage and said ground voltage, for dividing said supply voltage to the preset reference voltage;

comparing means for generating the temperature state signal by comparing said temperature detecting voltage generated from said temperature sensing means with said reference voltage; and offset compensating means connected between the output node of said reference voltage generating means and said ground voltage terminal, for compensating for said reference voltage by voltage drop of said disconnection detecting means.

10. The heating control circuit as claimed in claim 8, further comprised of said temperature state detecting means comprising:

reference voltage generating means connected between said supply voltage and said ground voltage, for dividing said supply voltage to the preset reference voltage;

comparing means for generating the temperature state signal by comparing said temperature detecting voltage generated from said temperature sensing means with said .preset reference voltage; and offset compensating means connected between the output node of said reference voltage generating means and said ground voltage terminal, for compensating for said reference voltage by voltage drop of said disconnection detecting means.

11. The heating control circuit as claimed in claim 9, further comprised of said offset compensating means comprising a current limiting resistor, a diode and a transistor, said offset compensating means connected between the output node of said reference voltage generating means and said ground voltage terminal, and biasing means for driving said transistor by dividing the output voltage of said diode, and compensating for said reference voltage by voltage drop of said switching means connected to the second terminal of said thermistor.

12. A circuit for sensing disconnection of a thermistor, having a heater controlled by a heater control signal and said thermistor installed around said heater, said thermistor exhibiting variable resistance according to ambient temperature, comprising:

temperature sensing means, for generating a temperature detecting voltage at a connecting node corresponding to the temperature of said heater, said temperature sensing means comprising first and second resistors connected between a supply voltage terminal and a ground voltage terminal, said connecting node between said first and second resistors being coupled to a first terminal of said thermistor;

disconnection detection means connected to a second terminal of said thermistor between said supply voltage and said ground voltage terminal, for generating a disconnection state signal in response to the output voltage from said second terminal of said thermistor, wherein said disconnection state signal indicates whether said thermistor is correctly connected in said circuit;

filtering means for low-pass filtering said temperature detecting voltage generated from said temperature sensing means;

temperature state detecting means for generating a temperature state signal by comparing said temperature detecting voltage with a preset reference voltage; and heater controlling means for controlling said heater by generating said heater control signal in dependence upon said disconnection state signal and said temperature state signal.

13. The circuit as claimed in claim 12, further comprised of said disconnection state detector comprising:

a third resistor and a transistor connected in series between said supply voltage terminal and said ground voltage terminal;

driving means connected between the second terminal of said thermistor and said ground voltage terminal, for driving said transistor in response to a voltage across the second terminal of said thermistor; and means connected between the second terminal of said thermistor and the collector of said transistor, for clamping and input voltage to a given level in response to the switching of said transistor;

said disconnection state detector providing a disconnection state signal comprising a normal state signal to said heater control circuit when said thermistor correctly connected in said circuit.

14. The circuit as claimed in claim 13, further comprised of said driving means having a diode and a current limiting resistor connected serially between the second terminal of said thermistor and said ground voltage terminal, and dividing a voltage across the second terminal of said thermistor to a base driving voltage of said transistor.

15. A circuit for sensing an error of a temperature sensor having a heater controlled by a heater control signal, a resistor connected to receive a first supply voltage, and a thermistor connected through a first terminal to receive a voltage across said resistor, said thermistor being installed around said heater, said thermistor exhibiting a variable resistance varying according to ambient temperature, comprising:

disconnection detecting means connected between said first supply voltage and a second voltage terminal connected to a second terminal of said thermistor, for generating a disconnection state signal by detecting the current flowing through said second supply voltage terminal from the second terminal of said thermistor; and heater controlling means for controlling said heater when said disconnection state signal generated from said disconnection detector is indicative of said thermistor being properly connected in said circuit.

16. A fusing temperature control circuit for a printing device having a printing mode in which printing is occurring, a standby mode in which no printing is occurring, a fusing device for fusing toner onto paper at a fusing temperature and a heating device located in said fusing device for heating said fusing device to said fusing temperature, to maintain said heating device at a reference temperature, comprising:

a thermistor surrounding said fusing device, for sensing said fusing temperature, wherein said thermistor has an upper and lower terminal;

a connector having a first terminal connected to said upper terminal of said thermistor and second terminal connected to said lower terminal of said thermistor;

a temperature sensing circuit connected to said first terminal of said connector, for producing a temperature detecting voltage indicative of said fusing temperature sensed by said thermistor;

a low pass filter connected to said temperature sensing circuit, for filtering said temperature detecting voltage to produce a filters temperature detecting voltage;

a disconnection detecting circuit connected to said second terminal of said connector, for producing a disconnection state signal indicating whether said thermistor is properly connected to said first terminal of said connector and said second terminal of said connector;

a heating control circuit connected to said heating device, for producing a reference voltage control signal corresponding to said reference temperature and indicating said printing mode and said standby mode of said printing device, receiving said disconnection state signal and disabling said heating device when said thermistor is improperly connected to said first terminal of said connector and said second terminal of said connector and receiving a temperature state signal indicating a difference between said fusing temperature and said reference temperature and controlling said fusing temperature in response to said temperature state signal; and a temperature state detecting circuit for producing said temperature state signal in response to said filtered temperature detecting voltage and said reference voltage control signal.

* * * * *